United States Patent [19]
Karcher et al.

[11] 3,856,336
[45] Dec. 24, 1974

[54] COUPLING ASSEMBLY

[75] Inventors: Thomas D. Karcher, Rocky River; Walter W. Antoniw, Lakewood, both of Ohio

[73] Assignee: The Hansen Manufacturing Company, Cleveland, Ohio

[22] Filed: Feb. 7, 1973

[21] Appl. No.: 330,395

[52] U.S. Cl................. 285/316, 285/318, 403/229, 403/325
[51] Int. Cl............................................ F16l 37/22
[58] Field of Search ........... 285/316, 317, 318, 321, 285/84, 85; 403/229, 350, 351, 325

[56] References Cited
UNITED STATES PATENTS

| | | | |
|---|---|---|---|
| 2,023,428 | 12/1935 | Liebhardt | 285/317 |
| 2,805,089 | 9/1957 | Hansen | 285/317 |
| 2,898,130 | 8/1959 | Hansen | 285/317 |
| 3,385,613 | 5/1968 | McCall | 285/84 |
| 3,459,443 | 8/1969 | Butters et al. | 285/318 |
| 3,684,321 | 8/1972 | Hundhausen | 285/316 |
| 3,727,952 | 4/1973 | Richardson | 285/316 |

*Primary Examiner*—Werner H. Schroeder

[57] ABSTRACT

An improved coupling assembly includes a plug member which is held in a socket chamber by a lock spring having a plurality of turns. The turns of the lock spring resiliently grip a plurality of turns of a helix on the outside of the plug member to hold the plug member in the socket chamber. To promote a secure-gripping engagement between the turns of the lock spring and the helix, the turns of the lock spring have the same pitch as the helix. The lock spring can be resiliently flexed to increase the inside diameter of the turns of the lock spring from a free diameter which is smaller than the external diameter of the helix to a diameter which is larger than the outside diameter of the helix to enable the plug member to be readily inserted into the turns of the lock spring. The lock spring is then released so that its natural resilience causes its turns to grip the helix formed on the outside of the plug member.

8 Claims, 6 Drawing Figures

COUPLING ASSEMBLY

BACKGROUND OF THE INVENTION

This invention relates generally to a coupling assembly and more specifically to a coupling assembly having a lock spring with a plurality of turns of coils which grippingly engage a plurality of turns of a helix formed on the outside of a plug member.

A coupling assembly having a resiliently deflectable lock ring which engages an annular groove formed in a plug member to hold the plug member against movement relative to a socket member is disclosed in U.S. Pat. No. 2,805,089 to Howard J. Hansen. When the lock ring disclosed in this patent is in a plug holding condition, the lock ring is free or unflexed. When the plug member is to be withdrawn from the socket member, the lock ring is flexed to increase its internal diameter so that the plug member can be axially moved through the single turn of the lock ring. The lock ring in the Hansen patent is flexed to release the plug member by rotating a sleeve which is connected with the lock ring. Upon being released, the natural resilience of the lock ring enables it to move the sleeve and return to its unflexed or free condition.

SUMMARY OF THE PRESENT INVENTION

A coupling assembly constructed in accordance with the present invention includes a plug member having an outer surface forming a helix which has a plurality of turns. This plug member is received in a chamber formed in a socket member. The plug member is held in the socket member by a coil type lock spring having a plurality of turns which resiliently grip turns of the helix on the plug member.

When this lock spring is in a free or unflexed condition, the turns of the lock spring have a free diameter which is less than the root diameter of the helix. When the plug member is to be inserted into the socket member, a sleeve is rotated to flex the lock spring and increase the internal diameter of its turns to a diameter which is greater than the crest diameter of the helix. After the plug member has been inserted into the enlarged opening defined by the resiliently flexed turns of the lock spring, the sleeve is released and the turns of the lock spring move toward the unflexed or free condition. Since the helix has a root diameter which is greater than the internal diameter of the turns of the unflexed lock spring, the lock spring resiliently grips the helix on the outside of the plug member to hold the plug member in the socket member. To promote this gripping engagement between the turns of the lock spring and the helix on the outside of the plug member, the turns of the lock spring and the helix have the same pitch.

Accordingly, it is an object of this invention to provide a new and improved coupling assembly in which a plug member is retained against movement relative to a socket member by a lock spring having a plurality of turns or coils which grippingly engage a helix formed on the outside of the plug member.

Another object of this invention is to provide a new and improved coupling assembly which includes a lock spring which grips the outer surface of a plug member along a plurality of turns of a helix formed on the outside of the plug member, a sleeve member for resiliently flexing the lock spring to increase the diameter of the turns of the lock spring from a free internal diameter which is less than the root diameter of the helix to a diameter which is greater than the crest diameter of the helix, and a detent assembly for retaining sleeve member in a desired position.

Another object of this invention is to provide a new and improved coupling assembly as set forth in any of the preceding objects and wherein the lock spring includes a plurality of turns having the same pitch as the helix formed on the plug member.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 5:
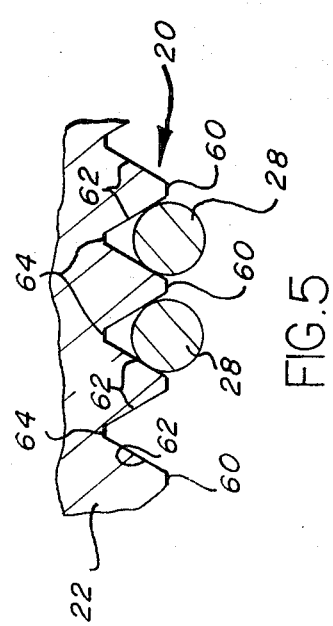
FIG. 5 is an enlarged sectional view illustrating the relationship between the turns of the lock spring and the helix on the outside of the plug member when the lock spring grips the helix in the manner illustrated in FIG. 1; and, FIG. 6 is a sectional view, generally similar to FIG. 1, of a second embodiment of the coupling assembly.

A coupling assembly 10 constructed in accordance with the present invention is utilized to connect a conduit 12 in fluid communication with a conduit 14. The coupling assembly 10 includes a lock spring 18 which resiliently grips a helix 20 formed on the outside of a plug member 22 to hold the plug member against movement relative to a socket member 24. To provide a secure grip between the lock spring 18 and helix 20, the lock spring includes a plurality of turns or coils 28 which have the same pitch as the helix (see FIGS. 1 and 5). The turns or coils 28 of the lock spring 18 have a free or unflexed internal diameter which is less than the root diameter of the helix 20 so that the lock spring will resiliently grip the plug member 22 to hold it against movement relative to the socket member 24 when the plug and socket members are interconnected.

Figure 2:
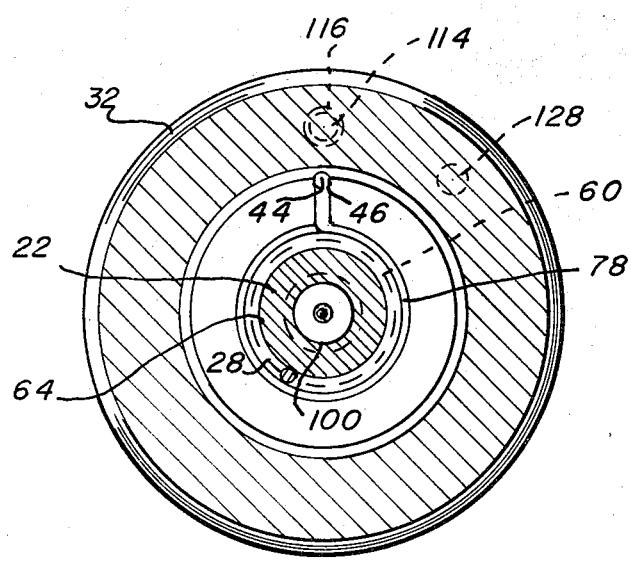
FIG. 2 is a sectional view, taken generally along the line 2—2 of FIG. 1, further illustrating the relationship between the lock spring and the plug member.
Figure 3:
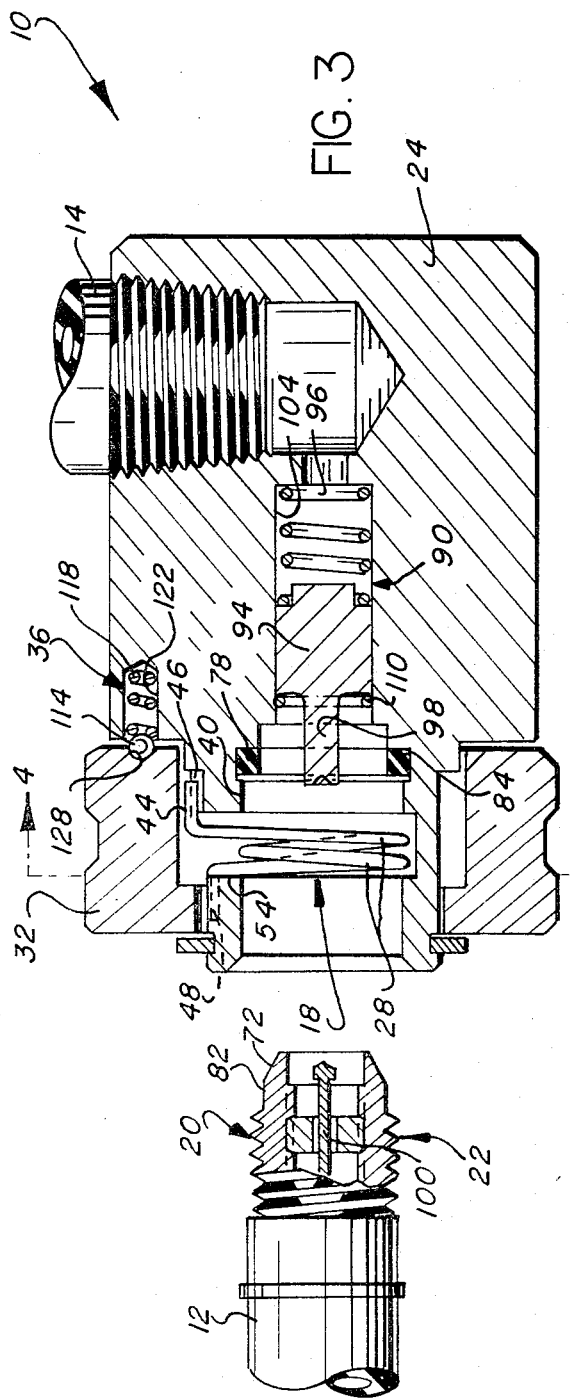
FIG. 3 is a sectional view, generally similar to FIG. 1, illustrating the plug and socket members in a disconnected condition and the lock spring in a resiliently flexed condition in which its turns have an internal diameter which is greater than the crest diameter of the helix on the plug member.
Figure 4:
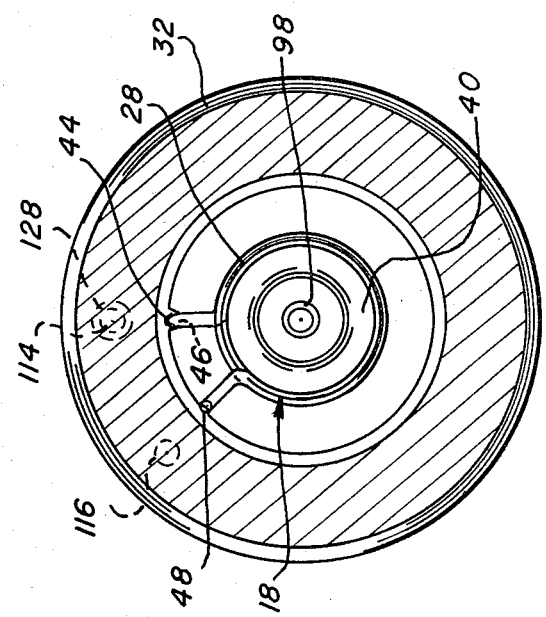
FIG. 4 is a sectional view, taken generally along line 4—4 of FIG. 3, illustrating the relationship between a sleeve for flexing the lock spring and a detent assembly for holding the sleeve against movement when the lock spring is in the flexed condition of FIG. 3.

When the plug and socket members 22 and 24 are to be disconnected, an annular sleeve 32 is rotated in a counterclockwise direction from the position shown in FIG. 2 to the position shown in FIG. 4. This rotational movement of the sleeve 32 resiliently flexes the lock spring 18 to increase the internal diameter of the coils 28 (FIG. 3) so that the plug member 22 can be withdrawn from the socket member 24. A detent assembly 36 holds the sleeve 32 in the actuated position of FIG. 3 against the influence of the resiliently deflected lock spring 18.

When the plug member 22 and socket member 24 are to be re-connected, the plug member is inserted into the enlarged coils 28 of the lock spring 18 and the sleeve 32 is rotated slightly to release the detent assembly 36. The natural resilience of the lock spring 18 then causes the turns or coils 28 to move toward their free or unflexed condition and into gripping engagement with the helix 20 on the outside of the plug member 22. It should be noted that since the helix 20 has a root diameter which is greater than the internal diameter of the turns 28 of the free or unflexed lock spring 18, the adjacent turns 28 of the lock spring resiliently grip the helix 20 to hold the plug member 22 against movement relative to the socket member 24.

Figure 1:
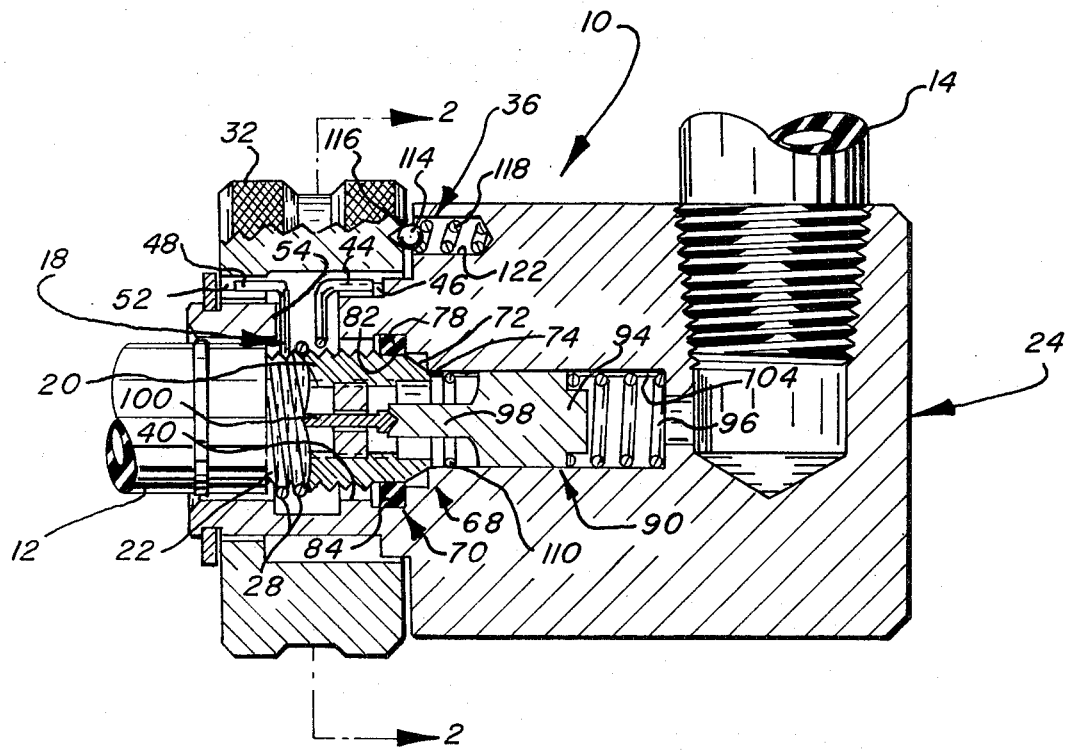
FIG. 1 is a sectional view of a coupling assembly constructed in accordance with the present invention and illustrating the manner in which a plurality of turns of a lock spring grip a plurality of turns of a helix on the outside of a plug member.

When the plug and socket members 22 and 24 are interconnected in the manner shown in FIG. 1, the lock spring 18 grips the helix 20 to hold the plug member in a cylindrical chamber 40 formed in the socket member. The lock spring 18 includes a forward end portion or arm 44 which engages a recess 46 in the socket member 24 to hold the end portion 44 against rotation relative to the socket member. Similarly, a rearward end portion or arm 48 of the lock spring 18 engages a hole 52 in the sleeve 32 to hold the rearward end portion 48 against rotation relative to the sleeve 32. When the turns 28 of the lock spring 18 grip the helix 20, the lock spring 18 abuttingly engages an annular end wall 54 of the socket member 24 to hold the plug member 22 in place in the chamber 40.

The coils 28 of the lock spring 18 are integrally formed with the arms 44 and 48 and resiliently grip the helix 20 with a radially inwardly directed pressure to securely engage the plug member 22 and hold it against movement relative to the socket member 24. To provide this resilient gripping engagement between the turns 28 of the lock spring 18 and the helix 20, the turns 28 have a free or unflexed internal diameter which is less than the root of the diameter of the helix 20. Therefore, the natural resilience of the lock spring 18 urges the turns 28 into secure gripping engagement with the turns of the helix 20.

The helix 20 and turns 28 of the lock spring 18 have the same pitch, that is the same number of turns per inch of axial length, so that each turn of the lock spring will cooperate with an associated turn of the helix. Thus, one of the turns 28 of the lock spring 18 is disposed between adjacent crests 60 (see FIG. 5) of the helix 20 and engages opposite side walls 62 of the helix outwardly of a root or trough 64 of the helix. Since the crests 60 extend outwardly of the point of engagement of the turns 28 with the side walls 62 of the helix 20, the lock spring 18 securely retains the plug member 22 against axial movement relative to the socket member 24. Although the lock spring 18 is illustrated in the drawings as having only two turns 28, it is contemplated that when the coupling assembly 10 is utilized in environments where relatively high pressure fluids are conducted through the conduits 12 and 14, the lock spring may have more than two turns to thereby increase the gripping action between the lock spring and helix 20.

When the plug member 22 is in the connected position of FIG. 1, two seals 68 and 70 prevent leakage of fluid from the coupling assembly 10. The first of these seals is a metal-to-metal seal which is provided by engagement of a frustro-conical end surface 72 of the plug member 22 with a circular seat 74 formed by the metallic body of the socket member 24. The lock spring 18 interacts with the helix 20 to press the surface 72 against the circular seat 74 upon rotation of the plug member 22 relative to the socket member 24. The seal 70 is formed by sealing engagement of an annular sealing washer 78 with a cylindrical outer surface 82 of the plug member 22 and a cylindrical inner surface 84 of the socket member 24. The resilient washer 78 is formed of a suitable elastomeric material such as rubber. Since the seal 70 is disposed in series with the seal 68, the two seals ensure that there will be a fluid tight connection between the plug 22 and socket member 24.

When the plug member 22 and socket member 24 are interconnected in the manner shown in FIG. 1, a plunger 90 having a square body portion 94 is pressed rearwardly against the influence of a spring 96 by engagement of a nose portion 98 with a valve actuator member 100. The pressure engagement to the nose portion 98 and valve actuator member 100 presses the valve actuator member inwardly (that is toward the left as viewed in FIG. 1) to open a valve assembly (not shown) in the plug member 22. Since the plunger 90 has a square body portion 94 and is disposed in a cylindrical chamber 104, fluid can flow from the conduit 12 around the square body of the plunger 94 and into the conduit 14 when the plug and socket member 22 and 24 are interconnected in the manner shown in FIG. 1.

When the plug and socket members 22 and 24 are to be disconnected, it is first necessary to disengage the turns 28 of the lock spring 18 from the helix 20. This is accomplished by rotatably separating the end portions 44 and 48 of the lock spring 18 to expand the turns or coils 28 of the lock spring. This is accomplished by merely rotating the sleeve 32. Since the rearward arm 48 of the lock spring 18 is disposed in the hole 52 in the sleeve 32 and the forward arm 44 of the lock spring 18 is disposed in the recess 46, rotation of the sleeve 32 (in a counter-clockwise direction as viewed in FIG. 2) moves the two arms 44 and 48 apart and resiliently flexes the turns 28 of the lock spring 18 to increase their internal diameter to a diameter which is greater than the crest diameter of the helix 20.

Once the turns or coils 28 of the lock spring 18 have been expanded by rotational movement of the sleeve member 32 and a separating of the end portions 44 and 48 of the lock spring, the plug member 22 can be readily withdrawn from the socket member 24. As the plug member 22 is withdrawn, the plunger 94 is moved outwardly by the spring 96 from the position shown in FIG. 1 to the position shown in FIG. 3 in which the plunger member 90 engages a stop ring 110. As the plunger 94 moves outwardly (that is toward the left as viewed in FIG. 3), the valve actuator 100 for the valve in the plug member 22 also moves outwardly to close the associated valve and shut off the flow of fluid from the conduit 12 through the plug member 22.

Since the turns or coils 28 of the lock spring 18 are resiliently expanded as the ends 44 and 48 of the lock spring are separated by rotation of the sleeve 32, the natural resilience of the lock spring 18 urges the sleeve 32 to return to a position in which the turns 28 are unflexed and have a relatively small diameter. To prevent this from occurring, the detent assembly 36 retains the sleeve 32 in the actuated position shown in FIG. 3 in which the turns 28 of the lock spring 18 have a relatively large internal diameter. The detent assembly 36 includes a ball 114 which is pressed into a conical recess 116 in the sleeve 32 by a detent spring 118 located in a chamber 122 in the socket member 24. Thus, the detent assembly 36 cooperates with the sleeve member 32 to retain the sleeve member 32 in the actuated position of FIG. 3 after the plug member 22 has been withdrawn. This facilitates reconnection of the plug and socket members 22 and 24.

When the plug and socket members 22 and 24 are to be reconnected, the plug member 22 is moved into the expanded turns of the lock spring 18. As the plug member 22 passes through the turns of the lock spring, the annular washer 78 engages the cylindrical outer surface 82 on the plug member to form a fluid tight seal between the plug member and socket member 24. Continued inward movement of the plug member 22 moves the tapered leading end surface 72 into abutting engagement with the circular seat 74 to form the metal-to-metal seal 68 between the plug member and socket member 24. After the washer 78 has sealingly engaged the cylindrical outer surface 82 of the plug member 22 and immediately before the metal-to-metal seal 68 is formed, the valve actuator 100 opens the valve in the plug member 22 so that fluid under pressure can flow from the conduit 12 through the plug member 22 and socket member 24 into the conduit 14.

After the plug member 22 has been inserted into the socket member 24, the sleeve member 32 is manually turned to release the detent assembly 36. The natural resilience of the lock spring 18 causes the turn or coils 28 of the spring to decrease in diameter and move into gripping engagement with the helix 20 on the plug member 22. As this occurs, the sleeve 32 is rotated in a clockwise direction (as viewed in FIG. 4) until a second recess 128 in the sleeve 32 moves into engagement with the retainer ball 114 of the detent assembly 36 in the manner shown in FIG. 1. The interaction between the ball 114 and recess 128 prevents accidental disconnection of the plug and socket members 22 and 24. The plug member 22 can then be rotated relative to the socket member 24 to cause the coils 28 of the lock spring 18 to press the surface 72 against the circular seat 74 to ensure the formation of a tight metal-to-metal seal 68.

Figure 6:
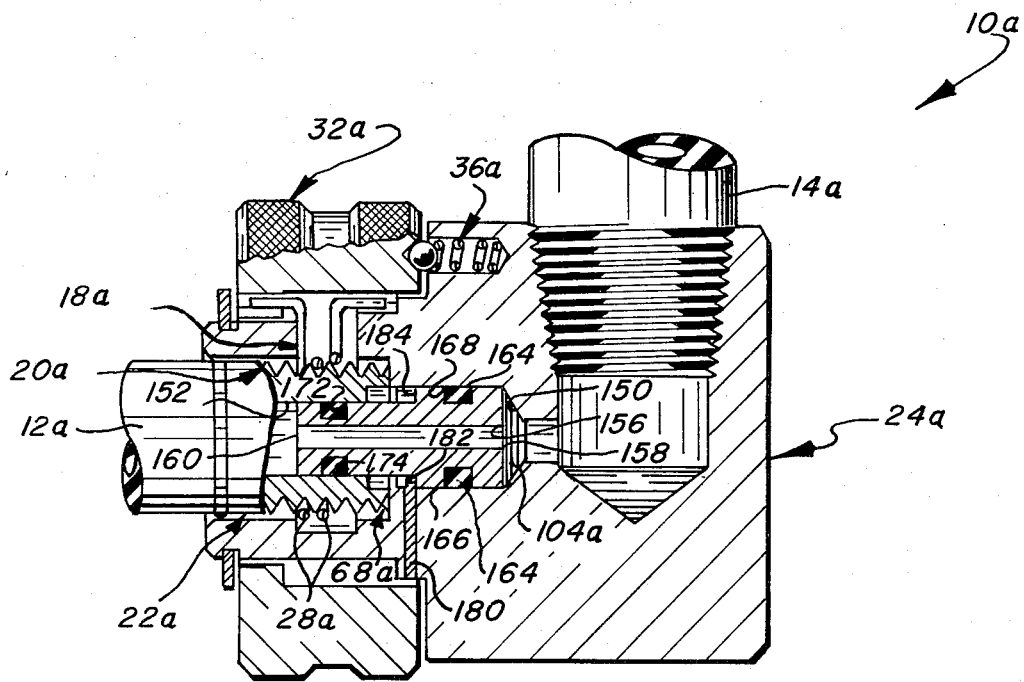

A second embodiment of the coupling assembly is disclosed in FIG. 6. The coupling assembly of FIG. 6 has a somewhat different sealing arrangement between the plug and the socket members than the coupling assembly of FIGS. 1 through 5. However, the construction of the coupling assembly of FIG. 6 is in many respects the same as the construction of the coupling assembly of FIGS. 1 through 5. In order to avoid prolixity of description, the elements of the coupling assembly of FIG. 6 will be referred to by numerals which are similar to corresponding elements of the coupling assembly of FIG. 1. The suffix letter "a" is associated with the numerals of FIG. 6 in order to avoid confusion.

The coupling assembly 10a includes a lock spring 18a which resiliently grips a helix 20a formed on the outside of a plug member 22a to hold the plug member against movement relative to a socket member 24a. To provide a secure grip between the lock spring 18a and the helix 20a, the lock spring includes a plurality of turns or coils 28a which have the same pitch as the helix. The turns or coils of the lock spring have a free or unflexed internal diameter which is less than the root diameter of the helix so that the lock spring will resiliently grip the plug member 22a to hold it against movement relative to the socket member 24a when the plug and socket member are interconnected.

When the plug and socket members 22a and 24a are to be disconnected, the annular sleeve 32a is rotated as previously explained in connection with the embodiment of the invention shown in FIG. 1. This rotational movement of sleeve 32a resiliently flexes the lock spring 18a to increase the internal diameter of the coils 28a so that the plug member 22a can be withdrawn from the socket member 24a. A detent assembly 36a holds the sleeve 32a in the actuated position against the influence of the resiliently deflected lock spring 18a. The embodiment of the invention shown in FIG. 6 differs from the embodiment of the invention shown in FIG. 1 in that a seal member 150 is disposed in a cylindrical chamber 104a and extends into sealing engagement with a cylindrical internal surface 152 of the plug member 22a. The seal member 150 is provided with a cylindrical central passage 156 which is disposed in a coaxial relationship with the plug member 22a and chamber 104a when the plug and socket members 22a and 24a are interconnected in the manner shown in FIG. 6. The passage 156 has a circular inlet 158 in the chamber 104a and a circular outlet 160 in the plug member 22a so that the passage 156 conducts fluid under pressure between the chamber 104a and the plug member 22a.

To prevent leakage of fluid around the cylindrical outer surface of the seal member 150, an annular seal ring 164 is disposed in sealing engagement with the cylindrical side wall 166 of the chamber 104a and with side and bottom surfaces of an annular groove 168 formed in the seal member 150. Similarly, a seal is formed between the internal surface 152 of the plug member 22a and the seal member 150 by a seal ring 172 disposed of in an annular groove 174.

When the plug and socket members 22a and 24a are disconnected, the frictional interaction between the seal ring 172 and the internal surface 152 of the plug member 22a tend to pull the seal member 150 out of the chamber 104a. To prevent this from happening, a retaining pin 180 has an inner end portion 182 which engages an annular shoulder 184 on the seal member 150 to hold the seal member in the chamber 104a.

Although it is contemplated that a fluid tight seal will be formed between the seal member 150 and the plug and socket members 22a and 24a by the seal rings 164 and 172, a metal-to-metal seal 68a is formed between the plug member 22a and the socket member 24a in the manner previously explained in connection with the embodiment of the invention illustrated in FIG. 1. It is contemplated that the plug member 22a will be rotated relative to the socket member 24a so that the coils 28a of the lock spring 18a will press the plug and socket members together to form a fluid tight seal 68a.

In view of the foregoing description, it can be seen that the coupling assembly 10 includes a plug member 22 having an outer surface which defines a helix 20. In the illustrated embodiment of the invention, the helix 20 has the same configuration as an external screw thread and has a plurality of convolutions which extend around the plug member 22. A lock spring 18 is mounted in the socket member 24 and has a plurality of turns or coils 28 which grippingly engage a plurality of turns of the helix 20. The turns 28 of the lock spring 18 have the same pitch as the helix 20. However, the turns 28 have a free or unflexed internal diameter which is less than the root or minimum diameter of the helix. Therefore, the turns 28 of the lock spring 18 resiliently grip the turns of the helix 20 to hold the plug member 22 against movement relative to the socket member 24. A sleeve 32 is rotatable to resiliently flex the turns 28 of the lock spring 18 and increase their diameter so that the plug member 22 can be quickly withdrawn from the socket member 24. A detent assembly 36 holds the sleeve member in an actuated position (FIG. 3) in which the turns 28 are resiliently flexed to thereby facilitate disengagement and re-engagement of the plug member 22 with the socket member 24.

Having described a specific preferred embodiment of the invention, the following is claimed:

1. A quick-connect coupling assembly for use in connecting first and second conduits in fluid communication, said coupling assembly comprising a plug member adapted to be connected with the first conduit, said plug member including outer surface means defining an external helix having a plurality of turns extending in a continuous path around said plug member, socket means adapted to be connected with the second conduit, said socket means including means defining chamber for receiving said plug member, coil spring means connected with said socket means for applying a radially inwardly directed force to said plug member along a plurality of turns of said helix to resiliently grip said plug member and hold said plug member in said chamber, said coil spring means including a resiliently deflectable coil spring having a plurality of turns of the same pitch as said external helix and a free internal diameter which is less than the root diameter of said helix, and means for resiliently flexing each of the plurality of turns of said coil spring to a simultaneously increase the internal diameter of each of said plurality of turns of said coil spring to a diameter which is greater than the crest diameter of said helix to facilitate rapid connection and disconnection of said coupling assembly.

2. A coupling assembly as set forth in claim 1 wherein said socket means includes internal surface means for sealingly engaging said plug member, said socket means and plug member being rotatable relative to each other about a central axis of said plug member when said plug member is at least partially disposed in said chamber, said socket means including means for holding one end portion of said coil spring against rotation relative to said socket means, said means for flexing said coil spring including means for holding a second end portion of said coil spring to enable said spring means to interact with said helix to press said plug member against said internal surface means to provide a tight seal upon relative rotation between said plug member and socket means.

3. A coupling assembly as set forth in claim 1 wherein said means for resiliently flexing said coil spring includes a sleeve member connected with one end portion of said coil spring and movable from a first position to a second position to increase the internal diameter of said turns of said coil spring, said coupling assembly further including detent means for retaining said sleeve member in the second position against the influence of said coil spring.

4. A coupling assembly as set forth in claim 1 wherein said plug member further includes a cylindrical outer surface defined by said surface means and disposed forwardly of said helix and a tapered leading end portion formed of metal and disposed forwardly of said cylindrical surface, said socket means including a metallic inner surface means for engaging said tapered leading end portion to provide a metal-to-metal seal between said socket means and plug member, said coupling assembly further including a seal washer disposed in said chamber and formed of an elastomeric material, said seal washer including circular inner surface means for sealingly engaging said cylindrical outer surface of said plug member at a location intermediate said tapered leading end portion of said plug member and said helix.

5. A coupling assembly as set forth in claim 1 wherein said outer surface means defining said helix includes means for defining a convoluted crest portion of said helix, a convoluted trough portion disposed between adjacent crest portions of said helix, and inwardly sloping side portions disposed between said crest and trough portions, said crest and trough portions of said helix having a plurality of turns extending around said plug member, said coil spring means being operable to resiliently grip said helix between adjacent crest portions of a plurality of turns of said helix to hold said plug member in said chamber.

6. A quick-connect coupling assembly for use in connecting first and second conduits in fluid communication, said coupling assembly comprising a plug member adapted to be connected with the first conduit, socket means adapted to be connected with the second conduit, said socket means including means defining chamber for receiving said plug member, coil spring means for gripping a circular outer surface of said plug member, said coil spring means including a resiliently deflectable coil spring having a plurality of turns and a free internal diameter which is less than the diameter of the circular outer surface of said plug member, means for resiliently flexing each of the plurality of turns of said coil spring to simultaneously increase the internal diameter of said turns of said coil spring to a diameter which is greater than the outside diameter of said circular outer surface of said plug member, said means for resiliently flexing said coil spring including a sleeve member connected with one end portion of said coil spring and movable from a first position to a second position to simultaneously increase the internal diameter of each of the plurality of turns of said coil spring, and detent means for retaining said sleeve member in the second position against the influence of said coil spring.

7. A coupling assembly as set forth in claim 6 wherein said plug member further includes tapered leading end portion formed of metal and disposed forwardly of said circular outer surface, said socket member including a metallic inner surface means for engaging said tapered leading end portion to provide a metal-to-metal seal between said socket and plug members, said coupling assembly further including a seal washer disposed in said chamber and formed of an elastomeric material, said seal washer including circular inner surface means for sealingly engaging said circular outer surface of said plug member at a location intermediate said tapered leading end portion of said plug member and said coil spring.

8. A coupling assembly for use in connecting first and second conduits in fluid communication, said coupling assembly comprising a plug member adapted to be connected with the first conduit, said plug member including outer surface means defining an external helix having a plurality of turns extending around said plug member, a cylindrical outer surface disposed forwardly of said helix, and a tapered leading end portion disposed forwardly of said cylindrical surface, socket means adapted to be connected with the second conduit, said socket means including means defining chamber for receiving said plug member, and a metallic inner surface means for engaging said tapered leading end portion to provide a metal-to-metal seal between said socket means and plug member, a seal washer disposed in said chamber and formed of an elastomeric material, said seal washer including circular inner surface means for sealingly engaging said cylindrical outer surface of said plug member at a location intermediate said tapered leading end portion of said plug member and said helix, coil spring means for applying a radially inwardly directed force to said plug member along a plurality of turns of said helix to resiliently grip said plug member, and coil spring means including a resiliently deflectable coil spring having a plurality of turns of the same pitch as said external helix and a free internal diameter which is less than the root diameter of said helix, means for resiliently flexing said coil spring to increase the internal diameter of said turns of said coil spring to a diameter which is greater than the crest diameter of said helix, said means for resiliently flexing said coil spring including a sleeve member connected with one end portion of said coil spring and movable from a first position to a second position to increase the internal diameter of said turns of said coil spring, and detent means for retaining said sleeve member in the second position against the influence of said coil spring.

* * * * *